United States Patent
Kyo (10) Patent No.: US 8,732,687 B2
(45) Date of Patent: May 20, 2014

(54) ARRANGEMENT METHOD OF PROGRAMS TO MEMORY SPACE, APPARATUS, AND RECORDING MEDIUM

(75) Inventor: Shorin Kyo, Minato-ku (JP)

(73) Assignee: NEC Corporation, Tokyo (JP)

( * ) Notice: Subject to any disclaimer, the term of this patent is extended or adjusted under 35 U.S.C. 154(b) by 249 days.

(21) Appl. No.: 13/256,788

(22) PCT Filed: Mar. 3, 2010

(86) PCT No.: PCT/JP2010/053431
§ 371 (c)(1),
(2), (4) Date: Sep. 15, 2011

(87) PCT Pub. No.: WO2010/106914
PCT Pub. Date: Sep. 23, 2010

(65) Prior Publication Data
US 2012/0042129 A1    Feb. 16, 2012

(30) Foreign Application Priority Data
Mar. 17, 2009 (JP) .................................. 2009-064301

(51) Int. Cl.
*G06F 9/45* (2006.01)
(52) U.S. Cl.
USPC ........................... 717/151; 717/153; 717/159
(58) Field of Classification Search
None
See application file for complete search history.

(56) References Cited

U.S. PATENT DOCUMENTS

| | | | | |
|---|---|---|---|---|
| 7,478,199 | B2 * | 1/2009 | Kimura | 711/125 |
| 2003/0005419 | A1 * | 1/2003 | Pieper et al. | 717/141 |
| 2004/0122966 | A1 * | 6/2004 | Hum et al. | 709/232 |
| 2005/0149916 | A1 * | 7/2005 | Shpeisman et al. | 717/140 |
| 2005/0160407 | A1 * | 7/2005 | Takamura et al. | 717/134 |
| 2005/0210453 | A1 | 9/2005 | Kimura | |
| 2011/0321021 | A1 * | 12/2011 | Chen et al. | 717/157 |

FOREIGN PATENT DOCUMENTS

| | | |
|---|---|---|
| JP | 2001-216140 A1 | 8/2001 |
| JP | 2001-282547 A | 10/2001 |
| JP | 2003-271394 A | 9/2003 |
| JP | 2004-509415 A | 3/2004 |
| JP | 2005-266941 A | 9/2005 |
| WO | 99/40516 A1 | 8/1999 |

* cited by examiner

Primary Examiner — Isaac Tecklu
(74) Attorney, Agent, or Firm — Sughrue Mion, PLLC (57) ABSTRACT

For a program that is made up of functions in units, each function is divided into instruction code blocks having a size CS where CS is the instruction cache line size of a target processor and an instruction code block that is $X^{th}$ counting from the top of each function F is expressed as (F, X). Flow information of nodes that take (F, X) as identification names is extracted from an executable file of the function program. For each identification name, as neighborhood weight of each identification name that differs from that identification name, information for which that the frequency of appearance of each identification name is taken into consideration that belongs to a function that differs from that function in the neighborhood of each appearing node in the flow information is found. Based on said neighborhood weight information, the functions are arranged in the memory space such that the number of conflicts of said instruction cache is reduced.

12 Claims, 8 Drawing Sheets

Fig.6A neighborhood weights of a0-a5

| identification name | weight |
|---|---|
| b0 | 1 |
| b1 | 1/2 |
| c0 | 1/3 |
| c1 | 1/5 |
| c2 | 1/6 |
| d0 | 1/4 |

Fig.6B neighborhood weights of a6

| identification name | weight |
|---|---|
| b0 | 8 |
| b1 | 4 |
| c0 | 16/3 |
| c1 | 8/5 |
| c2 | 4/3 |
| d0 | 3 |

Fig.6C neighborhood weights of a7

| identification name | weight |
|---|---|
| b0 | 7 |
| b1 | 7/2 |
| c0 | 5 |
| c1 | 29/15 |
| c2 | 3/2 |
| d0 | 29/15 |

Fig.6D neighborhood weights of a8

| identification name | weight |
|---|---|
| b0-b1 | 0 |
| c0-c2 | 0 |
| d0 | 0 |

Fig.6E neighborhood weights of b0, b1

| identification name | weight |
|---|---|
| a0-a5 | 0 |
| a6 | 9/2 |
| a7 | 14/3 |
| a8 | 1/7 |
| c0 | 4 |
| c1 | 2 |
| c2 | 8/5 |
| d0 | 8/3 |

Fig.6F neighborhood weights of c0

| identification name | weight |
|---|---|
| a0-a5 | 0 |
| a6 | 6 |
| a7 | 6 |
| a8 | 1/2 |
| b0 | 7/3 |
| b1 | 7/4 |
| d0 | 24 |

Fig.6G neighborhood weights of c1, c2

| identification name | weight |
|---|---|
| a0-a5 | 0 |
| a6 | 6 |
| a7 | 6 |
| a8 | 1/2 |
| b0 | 7/3 |
| b1 | 7/4 |
| d0 | 7/5 |

Fig.6H neighborhood weights of d0

| identification name | weight |
|---|---|
| a0-a5 | 0 |
| a6 | 8/5 |
| a7 | 31/20 |
| a8 | 1/5 |
| b0 | 7/6 |
| b1 | 1 |
| c0 | 24 |
| c1 | 4 |
| c2 | 8/3 |

Fig.7

| identification name | node weight | function weight |
|---|---|---|
| a0-a5 | 2.45 | 58.84 |
| a6 | 23.27 | |
| a7 | 20.87 | |
| a8 | 0 | |
| b0, b1 | 19.58 | 39.16 |
| c0 | 40.58 | 76.54 |
| c1, c2 | 17.98 | |
| d0 | 36.18 | 36.18 |

Fig.8C max(Wc0a6, Wa6c0)=6
max(Wc1a7, Wa7c1)=6
max(Wc2a0, Wa0c2)=1/6
max(Wc2a8, Wa8c2)=1/2
∴cache conflict score=12.67

Fig.8D max(Wc0a5, Wa5c0)=1/3
max(Wc1a6, Wa6c1)=6
max(Wc2a7, Wa7c2)=6
∴cache conflict score=12.3

Fig.8E max(Wc0a4, Wa4c0)=1/3
max(Wc1a5, Wa5c1)=1/5
max(Wc2a6, Wa6c2)=6
∴cache conflict score=6.53

Fig.8F max(Wc0a3, Wa3c0)=1/3
max(Wc1a4, Wa4c1)=1/5
max(Wc2a5, Wa5c2)=1/6
∴cache conflict score=0.7

Fig.8G max(Wc0a2, Wa2c0)=1/3
max(Wc1a3, Wa3c1)=1/5
max(Wc2a4, Wa4c2)=6
∴cache conflict score=6.53

Fig.8H max(Wc0a1, Wa1c0)=1/3
max(Wc1a2, Wa2c1)=1/5
max(Wc2a3, Wa3c2)=1/6
∴cache conflict score=0.7

Fig.9

| arrangement of function A | 0 | 1 | 2 | 3 | 4 | 5 | 6 | 7 |
|---|---|---|---|---|---|---|---|---|
| cache conflict score | 0.7 | 7.0 | 12.67 | 12.3 | 6.53 | 0.7 | 6.53 | 0.7 |

|   | A  | B | C  | D  | total |
|---|----|---|----|----|-------|
| A | 16 | 8 | 8  | 8  | 40    |
| B | 6  | 8 | 6  | 6  | 32    |
| C | 6  | 6 | 40 | 32 | 84    |
| D | 6  | 6 | 30 | 32 | 74    |

Fig.14

ARRANGEMENT METHOD OF PROGRAMS TO MEMORY SPACE, APPARATUS, AND RECORDING MEDIUM

CROSS REFERENCE TO RELATED APPLICATIONS

This application is a National Stage of International Application No. PCT/JP2010/053431, filed on Mar. 3, 2010, which claims priority from Japanese Patent Application No. 2009-064301, filed on Mar. 17, 2009, the contents of all of which are incorporated herein by reference in their entirety.

TECHNICAL FIELD

The present invention relates to a method of arranging functions of a program that is composed of a plurality of functions in the memory space of a computer system that incorporates an instruction cache.

BACKGROUND ART

Computer systems are typically provided with a small-capacity high-speed internal memory (cache) that is separate from an outside memory (main memory). High-speed reading of information is enabled by copying a portion of the information that is stored in the outside memory to the cache and then, when accessing this information, reading from the cache rather than from the outside memory. A cache is faster and more expensive than an outside memory, and the storage capacity of the cache is therefore normally far smaller than an outside memory. A cache includes a plurality of cache lines, and the copying of information from an outside memory to the cache is executed in line units. The memory space of the outside memory is therefore divided by cache line units and the divided memory areas are assigned in order to cache lines. The capacity of the cache is smaller than the capacity of the outside memory, and memory areas of the outside memory are therefore repeatedly assigned to the same cache lines. When the first access is performed to a particular address, the information of this address (data or program) is copied to the corresponding cache line in the cache, and when the next access is performed to the same address, the information is read directly from the cache. However, when programs (=instruction code strings) that are arranged at different addresses of the outside memory are assigned to the same cache line during operation of a program, the necessity arises for copying an instruction code string to the cache each time these instruction code strings are alternately read. Such cases are referred to as "instruction cache conflicts." Frequent occurrence of instruction cache conflicts results in the problem of slower execution of a program. To provide a solution to this problem, arrangement methods are being researched in which instruction code strings that have a high potential of operating in the same time interval are not placed on the same cache lines. Although caches include both instruction caches and data caches, the above-described problem of reading instruction code strings occurs with instruction caches. In addition, although there are typically three types of cache memory mapping methods: the direct scheme, the set-associative scheme, and the full-associative scheme, the above-described problem of cache conflicts is basically the same regardless of which scheme is considered, and the following explanation therefore will be performed on direct mapping by way of example.

To date, as a solution to the problem of instruction cache conflicts, there is a method that focuses on the composition of a program in function units and that thus defines a "function strength" that indicates the number of calls among functions or the number of calls of a specific function call pattern such that functions for which function strength is high (i.e., having a high probability of being read together) are not assigned to the same instruction cache lines. For example, Patent Document 1 discloses a method of finding by means of provisional arrangement, among functions, functions for which the number of executions in a specific pattern is high such as when a plurality of functions are called in a series or are called in a loop. Patent Document 2 discloses a method of, based on a dynamic function flow in which the call order of functions at the time of executing a program made up of a plurality of functions is represented as a time series, generating information of function strength such that information is included regarding the call relations at the times of execution between any function among the functions and all other functions and then, based on the information of function strength, arranging the functions in the memory space to reduce instruction cache conflicts.

LITERATURE OF THE PRIOR ART

Patent Documents

Patent Document 1: JP2001-282547A
Patent Document 2: JP2005-266941A

SUMMARY OF THE INVENTION

Thus, in the methods of the related art, function strength was established based on simply the number of calls that was found based on the number of times other functions are read in an instruction series in a particular function or on the number of calls of a specific function call pattern that takes into consideration the order of calls, or alternatively, upon consideration of the time-series correlation among functions at the time of execution, and functions were then arranged in memory space such that functions having high function strength were not assigned to the same instruction cache lines. However, in cases such as a built-in system in which the instruction cache capacity is small, i.e., when the size per cache line is small, and moreover, when the number of cache lines is also limited, cases occurred in which even a single function frequently had to be arranged to straddle a plurality of cache lines. In such cases, establishing exclusive utilization of cache lines among functions usually proved inherently problematic. For example, when a particular function monopolizes all cache lines, the exclusive arrangement of a different function in memory space is impossible from the outset. As a result, when the instruction cache capacity is small, it is to be expected that cases will frequently occur in which the number of cache conflicts cannot be effectively reduced by merely performing arrangement based on information of function strength that is found in function units as in the methods of the related art. This is because although cache conflicts normally exist at positions of occurrence that are of smaller units (cache lines) than functions, the methods of the related art do not employ information of the granularity of the mutual call relations of these cache line units when finding function strength.

It is therefore an object of the present invention to provide a method, an apparatus, and a program for arranging a program in a memory space that can effectively reduce the number of instruction cache conflicts even in a system in which the instruction cache capacity is small.

The instruction cache line size of the target processor is expressed as "CS." Each function is divided into instruction code blocks (ICBs) of a size that is equal to the instruction cache line size CS, and the $X^{th}$ instruction code block counting from the top of each function F is represented as (F, X). Flow information of a node that takes (F, X) as its identification name and that represents in a time series the call relations among instruction code blocks at the time of executing a program is created by tracing the call relations of instruction code blocks at the time of executing the program. Then, based on the flow information of the nodes, information is found for each identification name for which the frequency of occurrence of each identification name belonging to functions that differ from that identification name in the neighborhood of that appearing node in the flow information is taken into consideration as the neighborhood weight of each other identification name as seen from that node. Finally, based on the neighborhood weight information, a plurality of functions are arranged in a memory space such that the number of instruction cache conflicts is reduced.

By determining the arrangement of functions in memory based on conflict information in units of the size of cache lines according to the present invention, a program can be arranged in the memory space of a computer system that incorporates an instruction cache such that the number of instruction cache conflicts is decreased whereby the number of execution cycles of a program can be reduced.

EXPLANATION OF REFERENCE NUMBERS 11 program execution section
12 flow information creation section 13 flow information creation storage section
14 neighborhood weight information creation section
15 neighborhood weight table information storage section
16 function arrangement determination section
17 function arrangement designation information storage section
21 flow information
22 neighborhood weight table information
23 function arrangement designation information
101-104 steps

BEST MODE FOR CARRYING OUT THE INVENTION

An exemplary embodiment of the present invention will now be described in detail with reference to the accompanying drawings.

Figure 1:
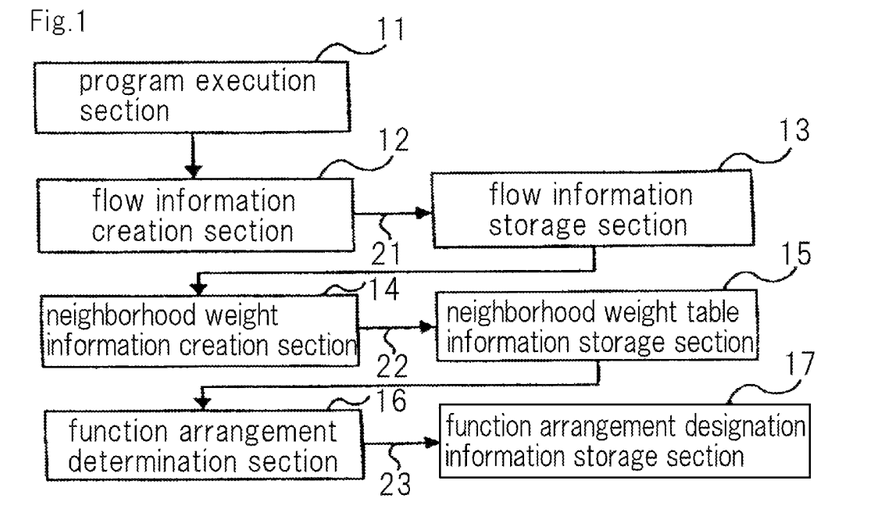
FIG. 1 is a block diagram of a program memory space arrangement apparatus of an exemplary embodiment according to the present invention.
Figure 2:
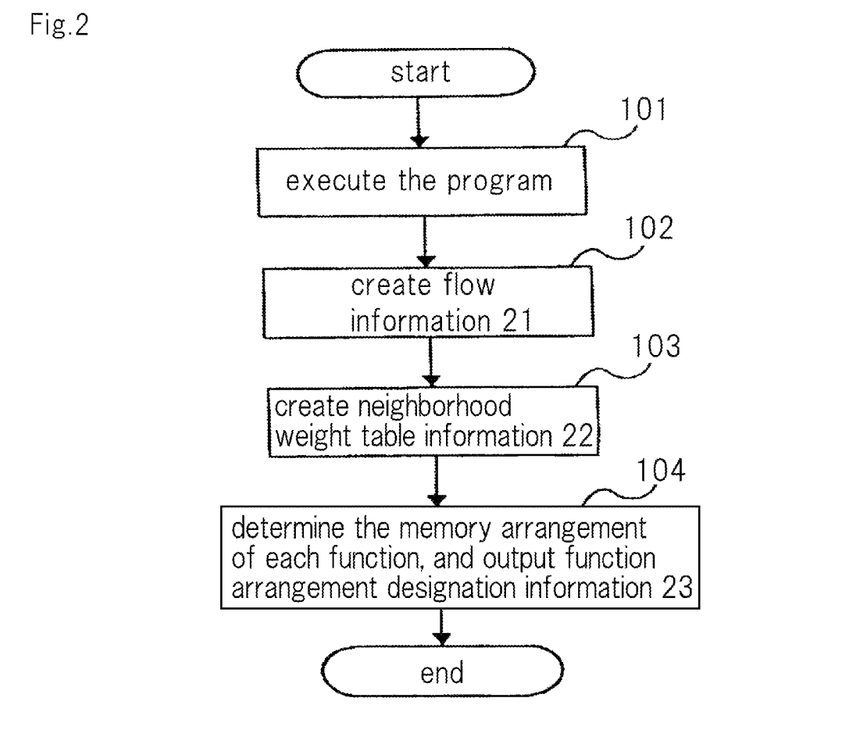
FIG. 2 is a flow chart showing the flow of processes of the program memory space arrangement apparatus of FIG. 1.

FIG. 1 is a block diagram of the program memory space arrangement apparatus according to an exemplary embodiment of the present invention, and FIG. 2 is a flow chart showing the flow of processes.

The program memory space arrangement apparatus of the present exemplary embodiment comprises: program execution section 11, flow information creation section 12, flow information creation storage section 13, neighborhood weight information creation section 14, neighborhood weight table information storage section 15, function arrangement determination section 16, and function arrangement designation information storage section 17.

Program execution section 11 executes the program that is the object of reducing the number of instruction cache conflicts by means of, for example, a simulator (Step 101).

In Step 102, flow information creation section 12 creates flow information 21 of ICBs by tracing the input/output of ICBs and stores the same in flow information creation storage section 13. Flow information 21 referred to herein is information in which the order of ICBs (the order in which ICBs are executed) that are used at the time of executing a program is arranged in a time series, and is information that exactly reflects the call relations among ICBs at the time of execution. The creation of flow information 21 will be described in greater detail later.

In Step 103, neighborhood weight information creation section 14 creates neighborhood weight table information 22 based on flow information 21 and stores the same in neighborhood weight table information storage section 15. This neighborhood weight table information 22, in contrast to the function strength information of the related art that is found from the number of function calls, the call order, and then time-series information for all functions, is information that, instead of taking functions as units, takes ICBs as units and is found from the number of calls among ICBs and the time-series call relations. The creation of neighborhood weight table information 22 will be described in greater detail later.

In Step 104, function arrangement determination section 16, by referring to neighborhood weight table information 22, determines the memory arrangement of each function such that the number of instruction cache conflicts is minimized and stores function arrangement designation information 23 to the instruction cache in function arrangement designation information storage section 17. P is assumed to be a value that indicates the possibility that cache line arrangement conflicts will occur between U, which is each ICB that belongs to function F that is the object of arrangement, and V, which is each ICB that belongs to all functions that have already been arranged. Regarding a case of adopting each of memory arrangements that exist in a number equal to the total number of instruction cache lines for arrangement-object function F, if V exists that shares cache lines with U, any of the neighborhood weight of V with respect to U that is described in neighborhood weight table information 22, the neighborhood weight of U with respect to V, or the average value of the two is added up to compute S as the cache conflict score when F adopts the relevant memory arrangement. Function arrangement designation information 23 is generated for all functions by assigning to function F the memory arrangement that gives, of the values of S that exist in a number equal to that of the instruction cache lines, the minimum S value. A linker should then actually assign and link each function to memory space based on this function arrangement designation information 23 to the instruction cache to produce an execution format module. The creation of function arrangement designation information 23 will be described in greater detail later.

Thus, in the present exemplary embodiment, by tracing the call relations of ICBs at the time of execution of a program, flow information 21 is produced that represents the call relations among ICBs at the time of execution as a time series, and based on this flow information 21, neighborhood weight table information 22 is generated that contains information regarding the number of calls or the call relations at the time of execution among all ICBs. This neighborhood weight table information 22 expresses mutual information among ICBs (relations between any ICB and all other ICBs) that was not considered in the prior art. The use of this information enables the realization of an optimum function arrangement that minimizes the number of instruction cache conflicts. In the following explanation, because the direct scheme can be seen as the set-associative scheme in which the number of ways of the cache is 1, the set-associative scheme that includes the direct scheme is used by way of example.

In addition, flow information creation storage section 13, neighborhood weight table information storage section 15, and function arrangement designation information storage section 17 may be consolidated as a single component.

Figure 3:
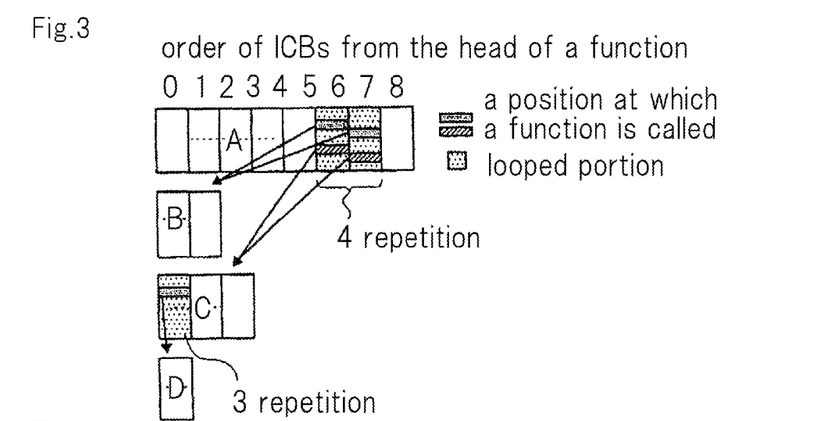
FIG. 3 shows the construction of an example of a program that is used in the program memory space arrangement apparatus of FIG. 1.
Figure 4:
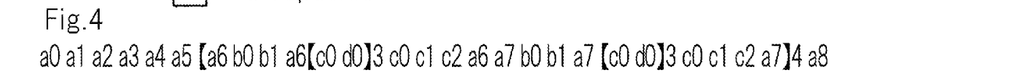
FIG. 4 shows flow information that is obtained by executing the program of FIG. 3.
Figure 5A:
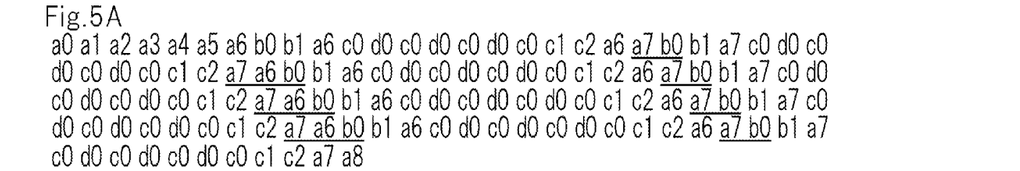
FIG. 5A shows interval a7b0 of flow information that is used in calculating neighborhood weight Wa7b0.
Figure 5B:
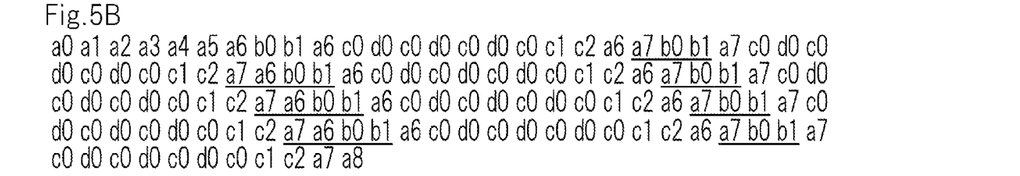
FIG. 5B shows interval a7b1 of flow information that is used in calculating neighborhood weight Wa7b1.
Figure 5C:
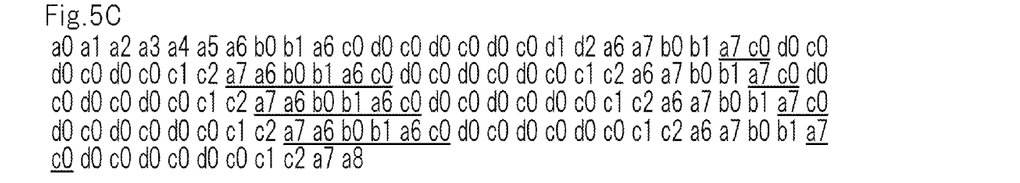
FIG. 5C shows interval a7c0 of flow information that is used in calculating neighborhood weight Wa7c0.
Figure 5D:
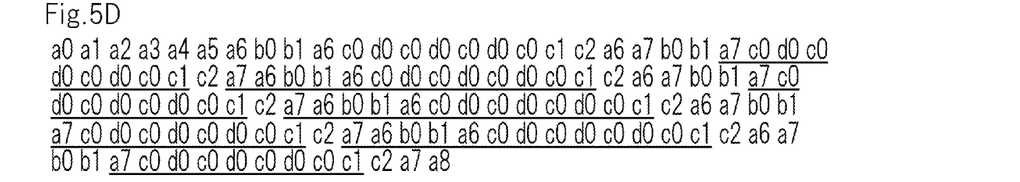
FIG. 5D shows interval a7c1 of flow information that is used in calculating neighborhood weight Wa7c1.
Figure 6A:
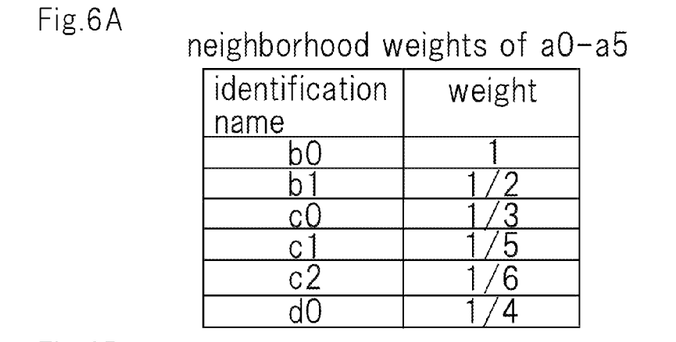
FIG. 6A shows neighborhood weight table information that is the result of finding neighborhood weights for all other ICBs that belong to functions B, C, and D of ICBa-a5 of function A.
Figure 6B:
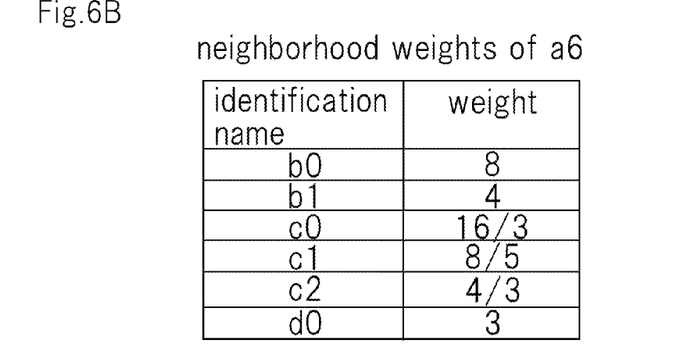
FIG. 6B shows neighborhood weight table information that is the result of finding neighborhood weights for all other ICBs that belong to functions B, C, and D of ICBa6 of function A.
Figure 6C:
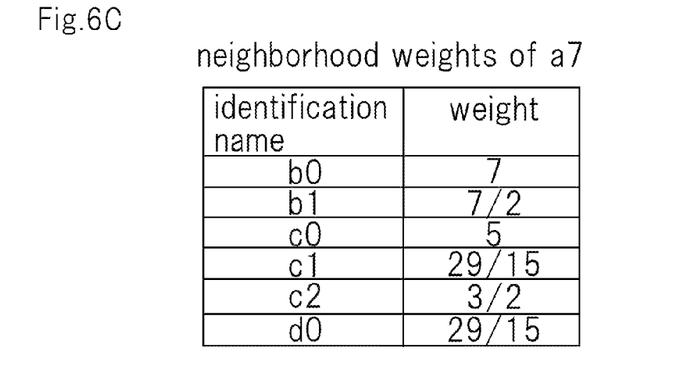
FIG. 6C shows neighborhood weight table information that is the result of finding neighborhood weights for all other ICBs that belong to functions B, C, and D of ICBa7 of function A.
Figure 6D:
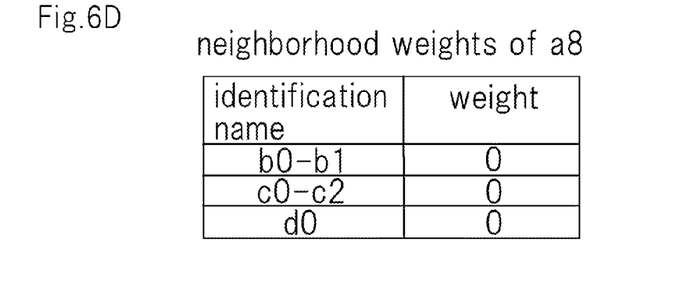
FIG. 6D shows neighborhood weight table information that is the result of finding neighborhood weights for all other ICBs that belong to functions B, C, and D of ICBa8 of function A.
Figure 6E:
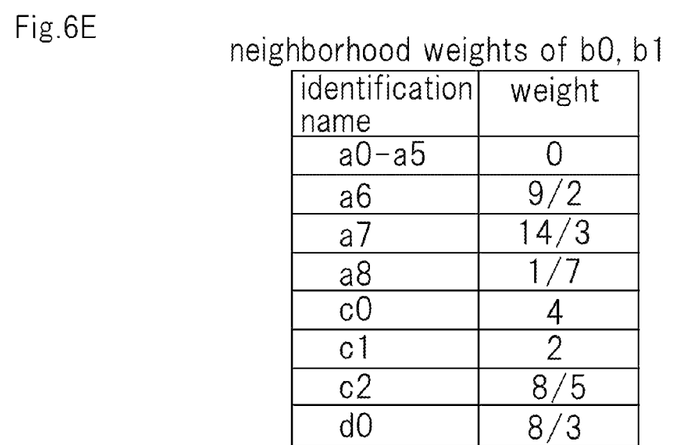
FIG. 6E shows neighborhood weight table information that is the result of finding neighborhood weights for all other ICBs that belong to functions A, C, and D of ICBb0 and b1 of function A.
Figure 6F:
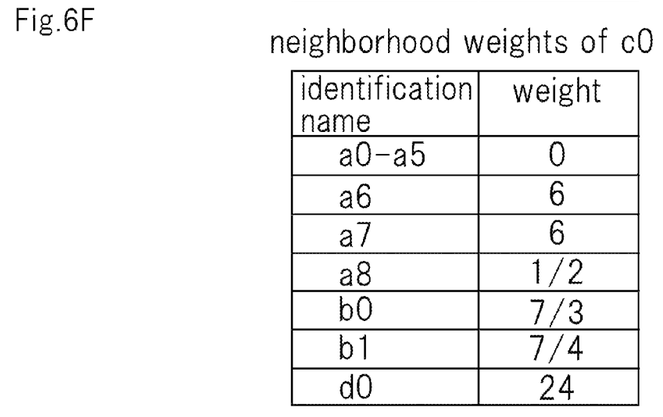
FIG. 6F shows neighborhood weight table information that is the result of finding neighborhood weights for all other ICBs that belong to functions A, B, and D of ICBc0 of function A.
Figure 6G:
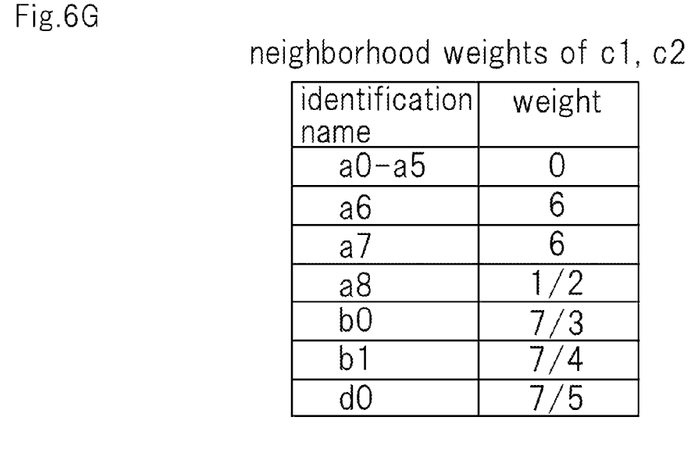
FIG. 6G shows neighborhood weight table information that is the result of finding neighborhood weights for all other ICBs that belong to functions A, B, and D of ICBc1 and c2 of function A.
Figure 6H:
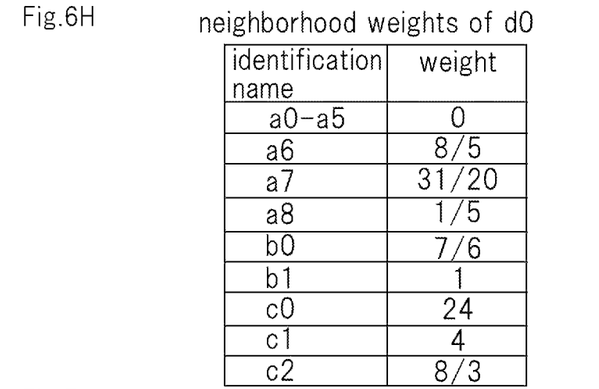
FIG. 6H shows neighborhood weight table information that is the result of finding neighborhood weights for all other ICBs that belong to functions A, B, and C of ICBd0 of function A.

Explanation first regards the extraction of flow information 21. The program that is the object is composed of functions A, B, C, and D shown in FIG. 3, and this program is executed by a simulator. In FIG. 3, functions A, B, C, and D are divided into code blocks (=ICBs) of a size equal to the cache line size CS of the target processor, each function occupying a nine-line portion, two-line portion, three-line portion, and one-line portion, respectively, of cache lines. Function B is then called from within the sixth ICB of function A, function C is next called from within the sixth ICB of function A, function B is next called from within the seventh ICB of function A, and function C is next called from the seventh ICB of function A. This is repeated four times. The calling of function D from the leading ICB of function C is further repeated three times. The identifier "FX" is given to the $X^{th}$ ICB counting from the top of each function F (=A–D). Flow information 21 is generated by recording in order all of the transitions among the ICBs that belong to different functions and that are produced during execution of simulation. FIG. 4 shows flow information 21 when executing the program of FIG. 3 that is composed of functions A, B, C, and D. In FIG. 4, a, b, c, and d signify functions A, B, C, and D, and the following numbers signify the ICB number in each function. In addition, "[ . . . ]#" means # repetitions of the content of [ . . . ]. Function A is first executed; function B is executed by calling function B in the sixth ICB of function A, i.e., a6; following which, after returning to function A from function B, function C is next executed by calling function C within the same a6; and in function C, function D is executed by calling function D in the top ICB, i.e., c0. This call is repeatedly issued three times in c0. Then, after returning to function A from function C, the previously-described call sequence of calling function B and then calling function C is again repeated in the seventh ICB of function A, i.e., a7. In addition, these sixth and seventh ICBs of function A are repeatedly executed a total of four times.

The generation of neighborhood weight table information 22 based on flow information 21 will next be described.

An example of neighborhood weight table information 22 is first described. The interval from reference to an ICB having the identification name ix in ICBs belonging to a particular function i until reference to an ICB having the identification name jy in ICBs belonging to function j (where j≠i) that is referred to first in the interval until the appearance of the same ICB ix is referred to as "ixjy," and the set that covers all flow information 21 is referred to as "Rixjy." For each interval ixjy, the score is "1/N" when there are a total of N types (including jy itself) of ICBs having different identification names among ICBs belonging to functions other than function i in the interval. The total value of the scores of all ixjy intervals that are contained in Rixiy is "neighborhood weight Wixjy" of ICBjy as seen from ICB ix. Thus, for each ICB (=x) belonging to all functions (=i), finding the neighborhood weight Wixjy for all ICBs y) belonging to functions (=j) that differ from itself is defined as neighborhood weight table information 22.

Because neighborhood weight Wixjy expresses the degree of the potential of the occurrence of cache conflicts when ix that is an ICB of function i and jy that is an ICB of function j (≠i) are arranged in the same cache line in flow information 21, scores are set to decrease with increasing occurrence of nodes belonging to other functions in the space from ICBix until ICBjy in intervals ixjy that start from each individual ICBix up to ICBjy that exists in the space up to encountering the next ICBix. In other words, the value of the score expresses the state that the potential for ICBix and ICBjy to cause a direct cache line conflict decreases with the increase in frequency of occurrence of references to instruction codes belonging to other functions in the space between ICBix and ICBjy. As a result, neighborhood weight Wixjy as the total of the scores that cover all intervals ixjy that exist in flow information 21 expresses the degree of the potential for the occurrence of a cache conflict when ICBix and ICBjy are arranged in the same cache line when the entire execution of a program is considered. The number of cache conflicts can be reduced by not arranging ICBix and ICBjy for which neighborhood weight Wixjy is small in the same cache line together, but by arranging ICBix and ICBjy for which neighborhood weight Wixjy is great in the same cache line.

As an example, FIG. 5 shows the method of finding neighborhood weight for ICBs of functions other than function A with respect to the seventh ICB (=a7) of function A among neighborhood weights Wixjy that are found from flow information 21 of FIG. 4. To facilitate the explanation, flow information 21 shown in FIG. 5 is expanded and described. First, FIG. 5A shows, by underlining, all a7b0 intervals that are considered for computing neighborhood weight Wa7b0 for the leading ICBb0 of function B. In this case, the total number of intervals in which b0 appears immediately after a7 is four, and the total number of intervals in which b0 appears after a7 with a6 interposed is three. In any interval, ICBs that belong to functions other than function A do not appear until the appearance of b0 from a7 and the scores of each interval are therefore all "1", whereby neighborhood weight Wa7b0 is found as "7." FIG. 5B shows by underlining all intervals a7b1 that are considered for calculating neighborhood weight Wa7b1 of the next ICBb1 of function B. In this case, there are a total of seven intervals a7b1, and further, for each interval in the interval until b1 appears immediately after a7, b0 appears once as an ICB that belongs to a function other than function A, whereby the scores of each interval are all ½. As a result, neighborhood weight Wa7b1 is found as 7×½, or 7/2. FIG. 5C shows by underlining all intervals a7c0 that are considered for computing neighborhood weight Wa7c0 for the leading ICBc0 of function C. In this case, the total number of intervals in which c0 appears immediately after a7 is four, and the total number of intervals in which b0 and b1 appear after a7 with c0 interposed is three. Accordingly, neighborhood weight Wa7c0 is found as 4+3×⅓, or 5. FIG. 5D shows by underlining all intervals a7c1 that are considered for computing neighborhood weight Wa7c1 for the next ICBc1 of function C. In this case, the score of the first interval is ⅓ because c0 and d0 that are ICBs of other functions appear after a7 with c0 interposed. Similarly, the scores of each following interval are ⅕, ⅓, ⅕, ⅓, ⅕, and ⅓. Accordingly, neighborhood weight Wa7c1 is found as ⅓+⅕+⅓+⅕+⅓+⅕+⅓, or 29/15. FIGS. 6A to 6H show neighborhood weight table information 22 that results from finding neighborhood weights for all other ICBs that belong to different functions with respect to all ICBs that appear in flow information 10, and that are found in this way.

Figure 7:
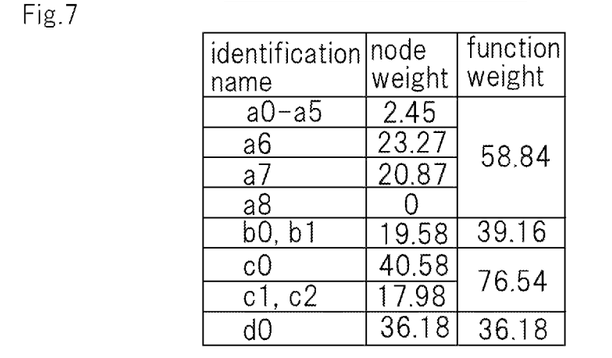
FIG. 7 shows the node weight and function weight of each ICB that are found from the neighborhood weight table information of FIG. 6A to FIG. 6H.
Figure 8A:
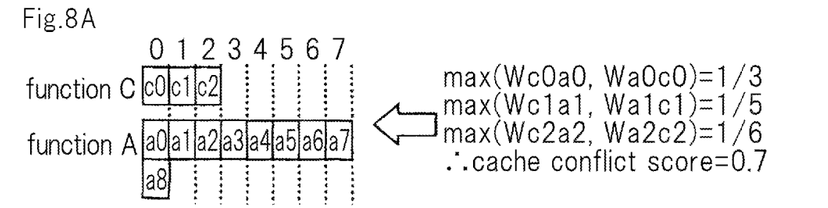
FIG. 8A shows the state of the calculation of cache conflict scores when function A is arranged from cache line 0 after arranging function C.
Figure 8B:
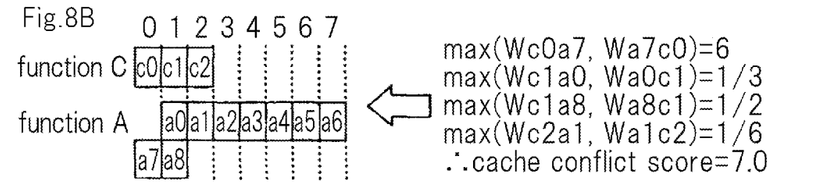
FIG. 8B shows the state of the calculation of cache conflict scores when function A is arranged from cache line 1 after arranging function C.
Figure 8C:
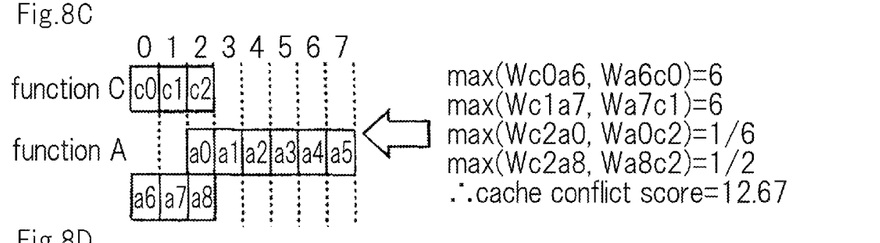
FIG. 8C shows the state of the calculation of cache conflict scores when function A is arranged from cache line 2 after arranging function C.
Figure 8D:
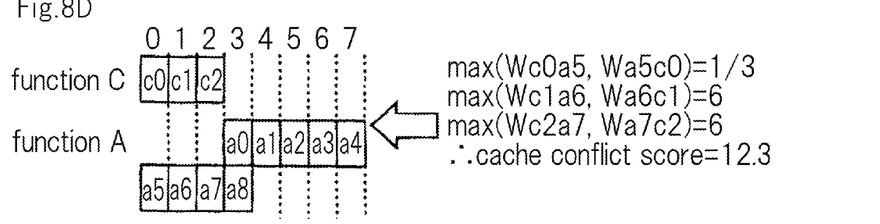
FIG. 8D shows the state of the calculation of cache conflict scores when function A is arranged from cache line 3 after arranging function C.
Figure 8E:
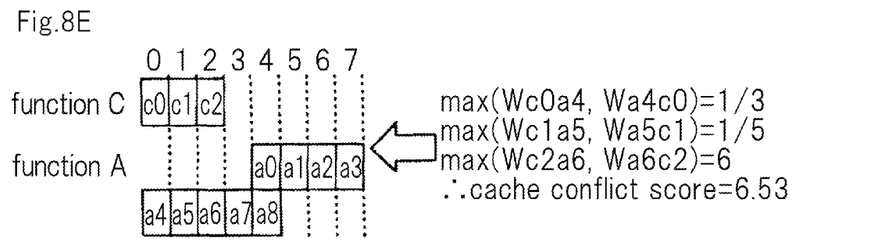
FIG. 8E shows the state of the calculation of cache conflict scores when function A is arranged from cache line 4 after arranging function C.
Figure 8F:
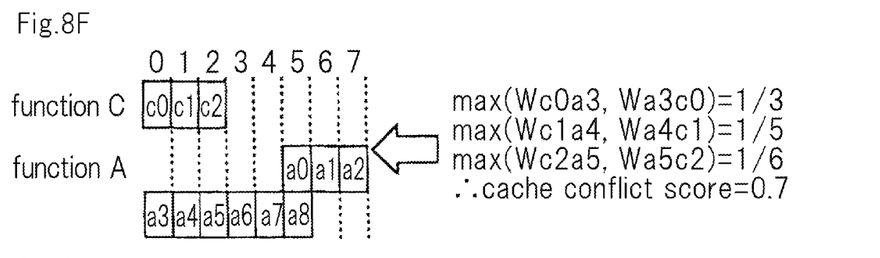
FIG. 8F shows the state of the calculation of cache conflict scores when function A is arranged from cache line 5 after arranging function C.
Figure 8G:
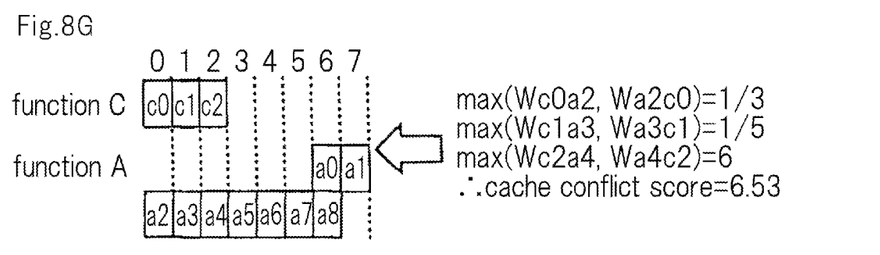
FIG. 8G shows the state of the calculation of cache conflict scores when function A is arranged from cache line 6 after arranging function C.
Figure 8H:
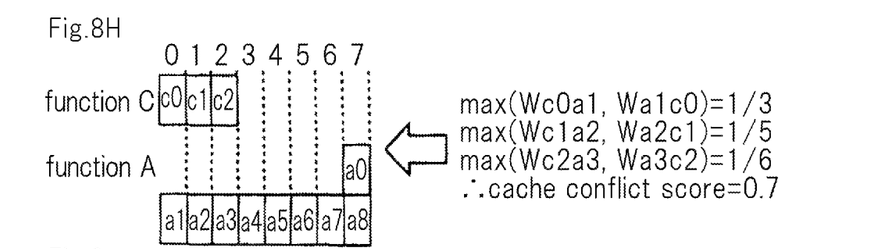
FIG. 8H shows the state of the calculation of cache conflict scores when function A is arranged from cache line 7 after arranging function C.

An example of the generation of function arrangement designation information 23 by referring to neighborhood weight table information 22 will next described. The generation of function arrangement designation information 23 is described for a case in which the program that is the object is composed of functions A, B, C, and D shown in FIG. 3, this flow information 21 is composed of FIG. 4 and FIG. 5, and moreover, each neighborhood weight table information 22 that is found is shown in FIG. 6A to FIG. 6H. To determine the function from which arrangement is to begin, function weight is first found which is the total of node weight for all ICBs in each function, the node weight being the total value of neighborhood weight of each ICB (with respect to ICBs that belong to other functions), and arrangement is then carried out in order from functions having greater function weight. This approach is adopted because a high value of function weight indicates that the ICBs contained in that function have a high degree of correlation with other functions when viewed from the overall execution of the program. Therefore, establishing the arrangement of these functions at an early stage increases the probability that the arrangement of that function will be considered in determining the arrangement of succeeding functions. FIG. 7 shows node weight and function weight that are found from neighborhood weight table information 22 of FIG. 6.

An example is next shown of generating function arrangement designation information 12 for a case that takes as target a processor in which the number of cache lines is "8" based on the node weight and function weight described above. First, after the appropriate arrangement (in this case, to a memory address that corresponds to cache line 0) of function C for which function weight is a maximum and taking function A that has the second-highest function weight as the arrangement-object function, FIG. 8 shows the computation of cache conflict scores for the arrangement of function A to each cache line number with respect to function C that has already been arranged. FIGS. 8A, 8B, 8C, 8D, 8E, 8F, 8G, and 8H each show cases of arranging function A from cache line 0, cache line 1, cache line 2, cache line 3, cache line 4, cache line 5 cache line 6, and cache line 7, respectively. In this case, the expression "arranging from cache line #" means "arranging the top of the function to the memory address that corresponds to cache line #." In addition, max (X, Y) is notation that means that the larger value of X and Y is used. As shown in FIG. 8, in this example, as the cache conflict score for arrangement to a particular cache line, the value of the larger of neighborhood weights Wixjy and Wjyix is added as the cache conflict score for a case in which ix that is an ICB that belongs to the arrangement-target function and jy that is an ICB that belongs to the function for which arrangement has been completed are loaded to the same cache line. As the reason for including only the larger value in this way, neighborhood weight Wixjy indicates the possibility that reference to jy will occur in a state in which ix is already on a cache line, and conversely, neighborhood weight Wjyix indicates the possibility that reference to ix will occur in a state in which jy is already on a cache line, and because the two possibilities normally only occur exclusively, including only the larger value as the cache conflict score is appropriate.

Figure 9:
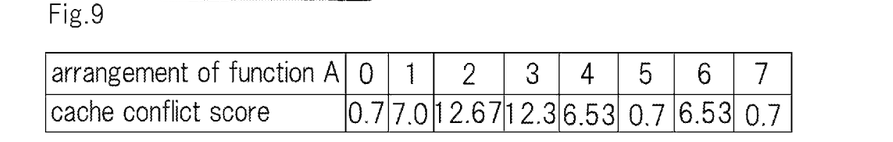
FIG. 9 shows the cache conflict scores that occur with the arrangement of function A to each cache line that was calculated in FIGS. 8A to 8H.
Figure 10:
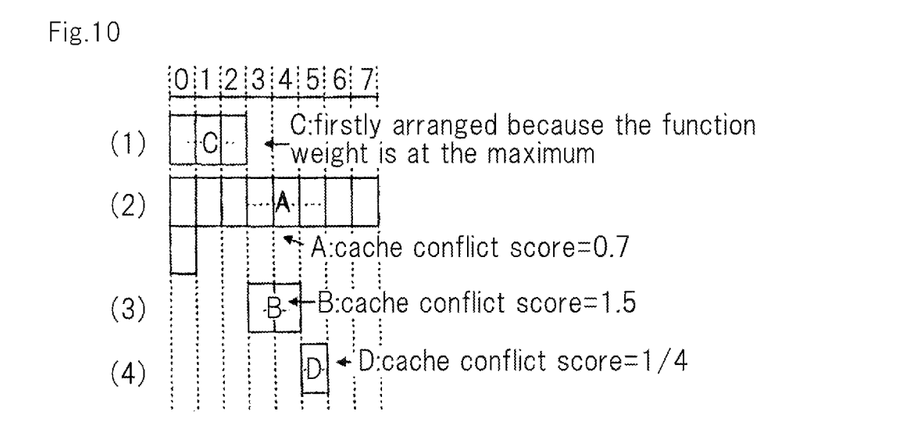
FIG. 10 shows function arrangement designation information that is generated from the exemplary embodiment of the present invention for the program of FIG. 3.

FIG. 9 is a table in which cache conflict scores have been collected for a case in which function A is arranged from each cache line number that was found in FIG. 8. From this table, it can be seen that the cache conflict score is a minimum when function A is arranged from the top of cache line 0, cache line 5, or cache line 7. In this case, function A may be arranged in any of the cache lines, but it will herein be assumed that determination is made to arrange function A in cache line 0. In the same way, the final arrangement result shown in FIG. 10 is obtained by successively arranging function B with respect to functions A and C that have already been arranged, and finally, function D with respect to functions A, C, and B that have already been arranged. In other words, function arrangement designation information 23 is obtained for arranging function C in cache line 0, and similarly, for arranging function A in cache line 0, arranging function B in cache line 3, and finally, arranging function D in cache line 5.

When an execution format module that is generated by the actual assignment and linking of each function to memory space by a linker based on function arrangement designation information 23 shown in FIG. 10 is executed on a target processor in which the number of cache lines is "8," each ICB is read only once to a corresponding cache line. Accordingly, the number of instruction cache conflicts (the number of times an ICB that has been read one time to the instruction cache is once again read to the instruction cache to again reference the ICB due to having been overwritten by the reading of another ICB) is "0."

Figure 11:
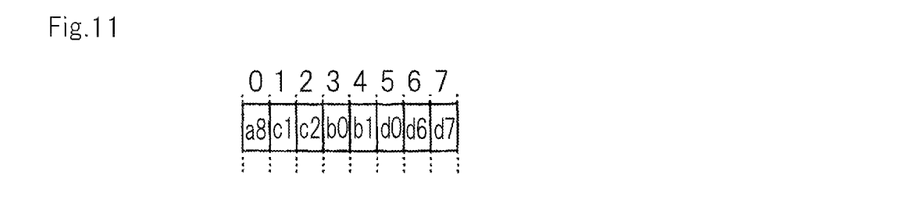
FIG. 11 shows identification names of ICBs that are stored in each cache line at the time of completing the execution of a program when memory arrangement has been carried out for each function in accordance with the function arrangement designation information of FIG. 10.

FIG. 11 shows which ICBs are stored in each line of the instruction cache at the time of completing execution of the program.

Figure 12:
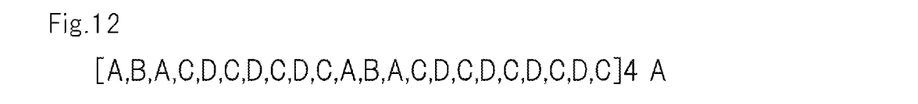
FIG. 12 shows dynamic function flow information that is used to determine the memory arrangement for functions of the program of FIG. 3 by the method of the prior art.
Figure 13:
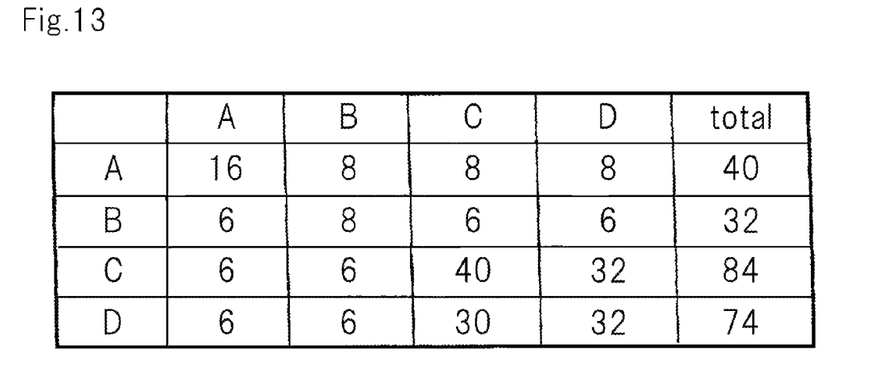
FIG. 13 shows the matrix of function strength information that is used in the determination of the memory arrangement for functions of the program of FIG. 3 by the method of the prior art.

The use of the method of the present invention therefore enables a large reduction of the number of instruction cache conflicts. In contrast, the result for a case in which the memory arrangement of a program having the execution flow of FIG. 3 to a target processor in which the number of cache lines is "8" is determined using a method of the prior art such as the basic exemplary embodiment of the method shown in Patent Document 2 that performs memory arrangement of a program having the execution flow of, for example, FIG. 3 based on function strength information that is found in function units is next shown. First, FIG. 12 and FIG. 13 show the result of finding dynamic function flow information and a matrix of the function strength information that are described in Patent Document 2. The dynamic function flow information herein refers to time series information of functions that is obtained by executing the object program by a simulator and tracing the input/output of each of functions A, B, C, and D and then recording in order all functions that were called from the start of execution of the program until completion. In addition, regarding the function strength information in its basic form, when Rij is the set of intervals from reference to a particular function i until function j is subsequently first referenced (where i is included but j is not included), n (i, j) [when i=j, n(i, j) is the total number of references of function i] that is found as the number of intervals in which function j is referenced at least one time among all intervals that are Rii from the dynamic function flow is defined as the function strength information.

Figure 14:
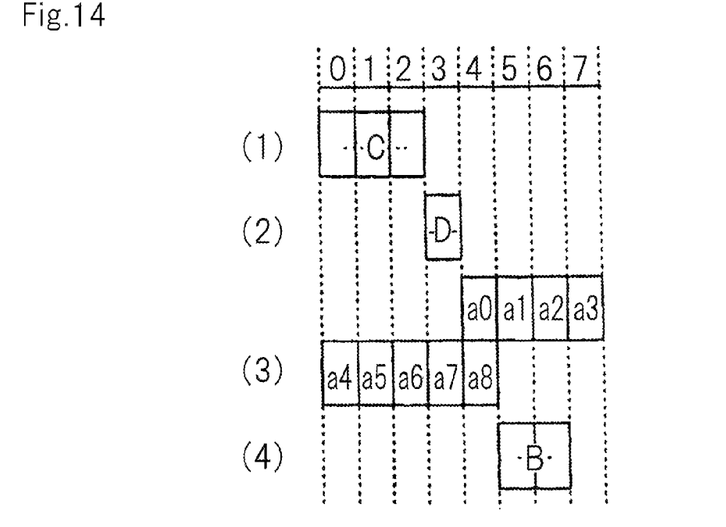
FIG. 14 shows the memory arrangement of functions of the program of FIG. 3 when the method of the prior art is used.

Next, as an example of the result of performing memory arrangement based on the dynamic function flow and function strength information of FIG. 12 and FIG. 13, FIG. 14 shows the result when arrangement is implemented in order of greater function strength or when arrangement is implemented in order of greater function strength pair values. In either case, arrangement is implemented in the order of functions C, D, A, B, and the same memory arrangements are therefore obtained. When a program having the execution flow of FIG. 3 is executed on a target processor for which the number of cache lines is "8" with the memory arrangement obtained in FIG. 14, the number of instruction cache conflicts is 13. In contrast, the number of instruction cache conflicts is 0 when the method of the present invention is used, whereby it can be seen that the use of the present invention enables a far more effective reduction of the number of instruction cache conflicts compared to the method of the prior art.

A method of the prior art such as in Patent Document 2 discloses an example in which the execution frequency distribution for, for example, each cache line is considered to implement arrangement such that cache lines having high execution frequency among functions do not overlap. However, the execution frequency information itself for each cache line is information that has no inherent direct relation to the occurrence of cache conflicts, such as when the execution frequency of a cache line that contains corresponding instruction code becomes high when there exists in a function a loop portion that is closed only in that function. It should therefore be obvious that even when such information is considered, a method that focuses on the call relations among functions is essentially incapable of contributing to a reduction of the number of cache conflicts for a case in which the instruction cache capacity is small and few cache lines exist, i.e., a case in which a single function frequently straddles a plurality of cache lines.

The functions of this program memory space arrangement apparatus may also be realized by recording a program for realizing these functions on a recording medium that can be read by a computer and then by causing a computer to read and execute the program that is recorded on this recording medium. The recording medium that can be read by a computer refers to a recording medium such as a flexible disk, a magneto-optical disk, or a CD-ROM, or a memory apparatus such as a hard disk apparatus that is incorporated in a computer system. The recording medium that can be read by a computer further includes elements (a transfer medium or transfer waves) that hold the program dynamically for a short time interval such as in a case in which the program is transmitted by way of the Internet and components that hold the program temporarily such as a volatile memory in a computer that is used as a server in such cases.

Although the preferred embodiments of present invention have been described using specific terminology, such descriptions are made only for purposes of illustration, and it should be understood that various changes and modifications can be made without departing from the appended claims.

This application claims the benefit of priority based on Japanese Patent Application No. 2009-064301 filed on Mar. 17, 2009, the entire disclosure of which is hereby incorporated by reference.

The invention claimed is:

1. A program memory space arrangement method of arranging a plurality of functions of a program that is made up of said plurality of functions in a memory space of a processor system that is equipped with an instruction cache, said method comprising:

each having a size equal to the instruction cache line size of a target processor, tracing call relations of said instruction code blocks at a time of execution of said program to create flow information of nodes, identification name of each node being expressed by a name of a function to which each instruction code block belongs and an order of the instruction code block from top of the function, said flow information representing in a time series the call relations among instruction code blocks at the time of execution of said program;

based on said flow information of nodes, for each node in each function, finding, as neighborhood weight of each instruction code block that belongs to a function that differs from the function to which the instruction code block of the node in question belongs, information for which the frequency of appearance of each node that belongs to a function that differs from the function to which the instruction code block of the node in question belongs in the neighborhood of the node in question in said flow information is taken into consideration; and based on said neighborhood weight information, arranging said plurality of functions in the memory space such that the number of conflicts of said instruction cache is reduced.

2. The program function memory space arrangement method as set forth in claim 1, wherein when ixjy is an interval in said flow information from a node that belongs to function i and that has identification name ix to a node that has identification name jy and belongs to function j (where j≠i) and that first appears in an interval up to the appearance of a node of the same ix, and Rixjy is the set of ixjy covering all said flow information; for each interval ixjy, the score is taken as 1÷N when there is a total of N types including jy itself of nodes that belong to functions other than i and that have different identification names in the interval, and the total value of scores of all intervals ixjy contained in Rixiy is found as said neighborhood weight Wixjy.

3. The program memory space arrangement method as set forth in claim 1, wherein the total value of neighborhood weights of each individual instruction code block that belongs to a function that differs from the function to which the instruction code block in question belongs is found as the node weight of the instruction code block in question, function weight is found as the total of said node weight of all instruction code blocks in each function, and arrangement to memory space in order from functions having greater function weight is carried out.

4. The program memory space arrangement method as set forth in claim 1, wherein when the arrangement-object function that is the current object of arrangement is arranged from the top of each cache line number with respect to functions for which arrangement has already been completed, if each instruction code block ix that belongs to the arrangement-object function and instruction code block jy that belongs to a function for which arrangement is completed are loaded to the same cache line, the cache line arrangement that gives the minimum cache conflict score among the cache conflict scores in each cache line arrangement of the arrangement-object function that are calculated by adding, of neighborhood weight Wixjy and neighborhood weight Wjyix, the value that is greater as the cache conflict score, is taken as the cache line arrangement of the arrangement-object function.

5. A hardware apparatus for arranging functions of a program that is made up of a plurality of said functions in a memory space of a processor system that is equipped with an instruction cache, said hardware apparatus comprising:

each having a size equal to the instruction cache line size of a target processor, flow information creation means that traces call relations of said instruction code blocks at a time of execution of said program to create flow information of nodes, identification name of each node being expressed by a name of a function to which each instruction code block belongs and an order of the instruction code block from top of the function, said flow information representing in a time series the call relations among instruction code blocks at the time of execution of said program;

neighborhood weight information creation means that, based on said flow information of nodes, for each node in each function, finds, as neighborhood weight of each instruction code block that belongs to a function that differs from the function to which the instruction code block of the node in question belongs, information for which the frequency of appearance of each node that belongs to a function that differs from the function to which the instruction code block of the node in question belongs in the neighborhood of the node in question in said flow information is taken into consideration; and function arrangement position determination means that, based on said neighborhood weight information, arranges said plurality of functions in the memory space such that the number of conflicts of said instruction cache is reduced.

6. The hardware apparatus as set forth in claim 5, wherein: when ixjy is an interval in said flow information from a node that belongs to function i and that has identification name ix to a node that has identification name jy and belongs to function j (where j≠i) and that first appears in an interval up to the appearance of a node of the same ix, and Rixjy is the set of ixjy covering all said flow information; said neighborhood weight information creation means, for each interval ixjy, takes the score as 1÷N when there is a total of N types including jy itself of nodes that belong to functions other than i and that have different identification names in the interval, and finds the total value of scores of all intervals ixjy contained in Rixiy as said neighborhood weight Wixjy.

7. The hardware apparatus as set forth in claim 5, wherein said function arrangement position determination means takes the total value of neighborhood weights of each individual instruction code block that belongs to a function that differs from the function to which the instruction code block in question belongs, as the node weight of the instruction code block in question, finds function weight as the total of said node weight of all instruction code blocks in each function, and carry outs arrangement to memory space in order from functions having greater function weight.

8. The hardware apparatus as set forth in claim 5, wherein: when the arrangement-object function that is the current object of arrangement is arranged from the top of each cache line number with respect to functions for which arrangement has already been completed, if each instruction code block ix that belongs to the arrangement-object function and instruction code block jy that belongs to a function for which arrangement is completed are loaded to the same cache line, said function arrangement position determination means takes the cache line arrangement that gives the minimum cache conflict score among the cache conflict scores in each cache line arrangement of the arrangement-object function that are calculated by adding, of neighborhood weight Wixjy and neighborhood weight Wjyix, the value that is greater as the cache conflict score, as the cache line arrangement of the arrangement-object function.

9. A non-transitory computer readable recording medium storing a program for causing a computer to execute arrangement of functions of a program that is made up of a plurality of said functions to a memory space of a processor system that is equipped with an instruction cache, wherein said program causes the computer to perform the procedures of:

each having a size equal to the instruction cache line size of a target processor, tracing call relations of said instruction code blocks at a time of execution of said program to create flow information of nodes, identification name of each node being expressed by a name of a function to which each instruction code block belongs and an order of the instruction code block from the top of the function, said flow information representing in a time series the call relations among instruction code blocks at the time of execution of said program;

based on said flow information of nodes, for each node in each function, finding, as neighborhood weight of each instruction code block that belongs to a function that differs from the function to which the instruction code block of the node in question belongs, information for which the frequency of appearance of each node that belongs to a function that differs from the function to which the instruction code block of the node in question belongs in the neighborhood of the node in question in said flow information is taken into consideration; and based on said neighborhood weight information, arranging said plurality of functions in the memory space such that the number of conflicts of said instruction cache is reduced.

10. The recording medium as set forth in claim 9, wherein said procedure of creating flow information includes, when ixjy is an interval in said flow information from a node that belongs to function i and that has identification name ix to a node that has identification name jy and belongs to function j (where j≠i) and that first appears in an interval up to the appearance of a node of the same ix, and Rixjy is the set of ixjy covering all said flow information; for each interval ixjy, taking the score as 1÷N when there is a total of N types including jy itself of nodes that belong to functions other than i and that have different identification names in the interval, and finding the total value of scores of all intervals ixjy contained in Rixiy as said neighborhood weight Wixjy.

11. The recording medium as set forth in claim 9, wherein said procedure of arranging in memory space includes: taking the total value of neighborhood weights of each individual instruction code block that belongs to a function that differs from the function to which the instruction code block in question belongs as the node weight of the instruction code block in question, finding function weight as the total of said node weight of all instruction code blocks in each function, and carrying out arrangement to memory space in order from functions having greater function weight.

12. The recording medium as set forth in claim 9, wherein said procedure of arranging in memory space includes: when the arrangement-object function that is the current object of arrangement is arranged from the top of each cache line number with respect to functions for which arrangement has already been completed, if each instruction code block ix that belongs to the arrangement-object function and instruction code block jy that belongs to a function for which arrangement is completed are loaded to the same cache line, taking the cache line arrangement that gives the minimum cache conflict score among the cache conflict scores in each cache line arrangement of the arrangement-object function that are calculated by adding, of neighborhood weight Wixjy and neighborhood weight Wjyix, the value that is greater as the cache conflict score, as the cache line arrangement of the arrangement-object function.

* * * * *